Sept. 13, 1938. T. G. MONAHAN 2,130,324
METHOD OF MAKING METAL RINGS
Filed Oct. 2, 1934 8 Sheets-Sheet 4

Thomas G. Monahan
INVENTOR

BY Albert L. Ely
ATTORNEY

Sept. 13, 1938.　　　T. G. MONAHAN　　　2,130,324
METHOD OF MAKING METAL RINGS
Filed Oct. 2, 1934　　　8 Sheets-Sheet 7

INVENTOR
Thomas G. Monahan
ATTORNEY

Sept. 13, 1938.　　　T. G. MONAHAN　　　2,130,324

METHOD OF MAKING METAL RINGS

Filed Oct. 2, 1934　　　8 Sheets-Sheet 8

Fig. 15

INVENTOR
Thomas G. Monahan
BY Albert L. Ely
ATTORNEY

Patented Sept. 13, 1938

2,130,324

UNITED STATES PATENT OFFICE 2,130,324

METHOD OF MAKING METAL RINGS

Thomas G. Monahan, Cuyahoga Falls, Ohio, assignor to The Firestone Steel Products Company, Akron, Ohio, a corporation of Ohio Application October 2, 1934, Serial No. 746,527

6 Claims. (Cl. 153—2)

The invention relates to methods of making metal rings, and more especially it relates to procedure and mechanism for concurrently producing a plurality of metal rings by longitudinally shearing a helical coil of metal strip material.

In the illustrative embodiment of the invention herein presented, the invention is shown in its application to the manufacture of rings such as the side rings or removable flanges of pneumatic tire rims. In the manufacture of rings from heavy metal strips, it is required that the end portions of the strips be firmly gripped by the mechanism that bends them to circular shape, with the result that said end portions are more or less mutilated and require subsequently to be removed. By using longer metal strips, forming each into a helical coil, and then shearing the coil longitudinally to provide a plurality of individual rings, it is possible to produce a plurality of rings and have but two waste-ends from each coil instead of two from each ring as heretofore. On large production the saving thus effected is substantial.

The chief objects of the invention are to provide an improved method and improved apparatus for longitudinally shearing a helical coil of metal strip material; to provide apparatus of the character mentioned capable of shearing coils of a large number of different diameters; to provide for shearing the coils accurately to produce rings of the proper diameter; and to obviate waste in the manufacture of rings suitable for tire rim flanges. Other objects will be manifest.

Referring to the drawings, the apparatus comprises an upright support or frame 20, the upper part of which is provided with suitable vertical slideways for a reciprocable head 21. The latter is reciprocated by means of the usual eccentric one-revolution clutch (not shown), and the operation of said clutch is controlled by a foot pedal 22 that is pivoted at 23 at the base of the frame 20. The head 21 carries a removable adapter block 24 at its lower end, and the underside of said adapter block carries a tool holder 25 in which are mounted a plurality of cutting tools or blades 26, 26. The tool holder and tools are disposed obliquely with relation to the horizontal, being inclined upwardly toward the front of the machine.

Mounted upon the front of frame 20, below head 21, is a bracket-like structure 28 having an overhanging, forwardly and obliquely upwardly extending portion or horn 29. The top of horn 29 is transversely recessed at 30 and mounted in said recess is a die block 31 that is slightly tapered upwardly on its lateral faces, and has a tongue and groove connection with the horn structure at its bottom. The die block is disposed at the same oblique angle as the horn and tool holder 25, and carries a plurality of dies or stationary shear elements 32, 32 that cooperate with the respective blades 26 to shear the work when the head 21 is lowered.

Mounted upon the top of horn 29, at each side of die block 31 and parallel thereto, are stationary spreader shoes 34, 34. Said spreader shoes have tongue and groove connection with said horn, and the die block 31 and spreader shoes are fixedly secured to the horn by wedge blocks 35, 35 that are secured to the horn between the die block and the respective spreader shoe. Any suitable means such as the screws 36 may be employed for attaching said wedge blocks to the horn. Each spreader shoe 34 is formed with a plurality of transverse slots 37, 37, see Figures 1 and 14, and a shaft 38 is mounted in the spreader shoe, longitudinally thereof, so as to intersect said slots. Journaled on shaft 38 are a plurality of rollers 39, 39, which rollers are aligned with said slots and provide support for work mounted in said slots. The spreader shoes are so positioned with relation to the die block 31 and dies 32 thereon that work supported on the spreader shoes will span the die block, in proper relation to the dies to permit subsequent shearing of the work, but in slightly spaced relation to the dies to permit relative movement therebetween during the expanding of the work to size prior to the shearing operation.

Figures 10, 11, 12, 13, 14:
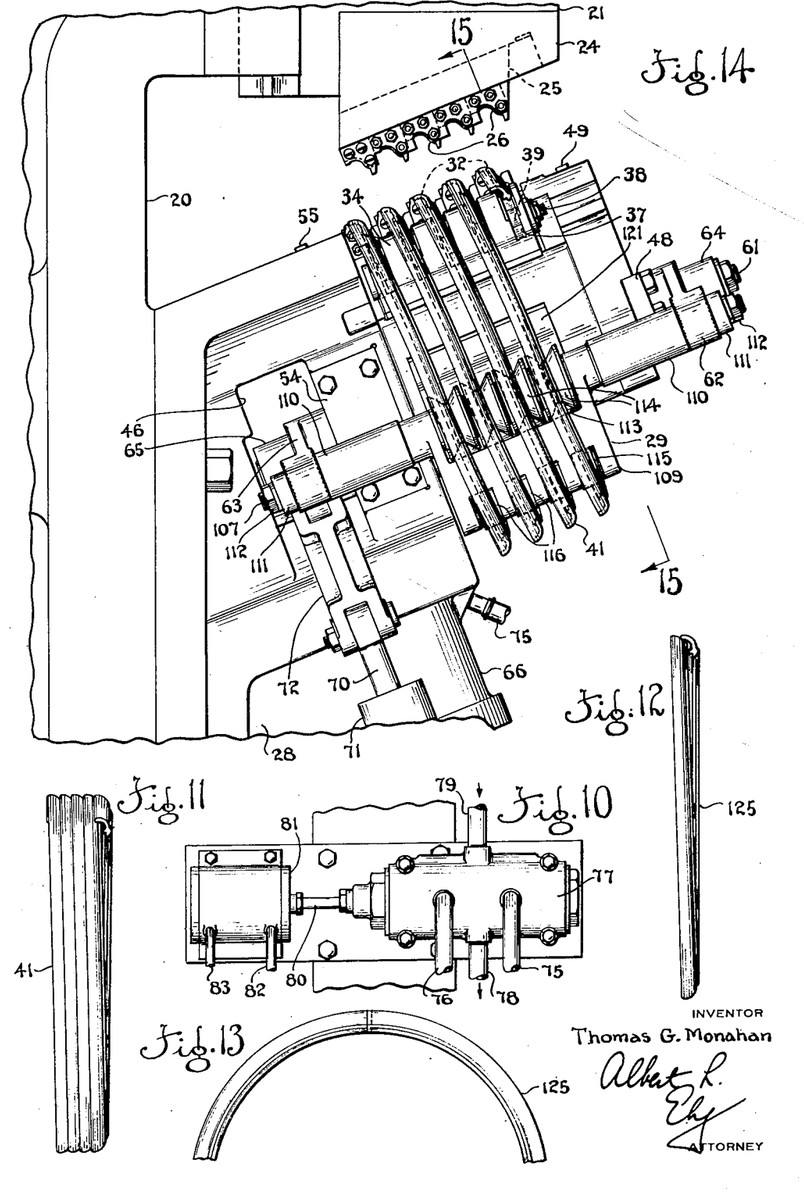
Figure 10 is an elevation of a four-way valve controlling the fluid pressure that operates the oscillating arms.
Figure 11 is an edge view of a helical coil of metal strip material constituting the work, before mounting in the improved shearing apparatus.
Figure 12 is an edge view of one of the rings produced from the coil shown in Figure 11.
Figure 13 is a fragmentary front elevation of the ring shown in Figure 12.
Figure 14 is a view similar to Figure 1 showing the operation of expanding the work to determinate size before the shearing operation.

The work as it comes to the shearing apparatus is a coil of strip metal 41 consisting of a plurality of laterally abutting, helical convolutions, the end portions of the coil, which require to be severed because of mutilation during the coiling operation, being substantially overlapped. The work shown is arcuate in cross-section, being designed for the manufacture of side flanges for pneumatic tire rims, so that the adjacent convolutions of the coil are more or less nested. The diameter of the coil is substantially the same as the finished rim flanges, that is, after the coil has been cut into individual rings and the ends of the latter welded together.

Figure 1:
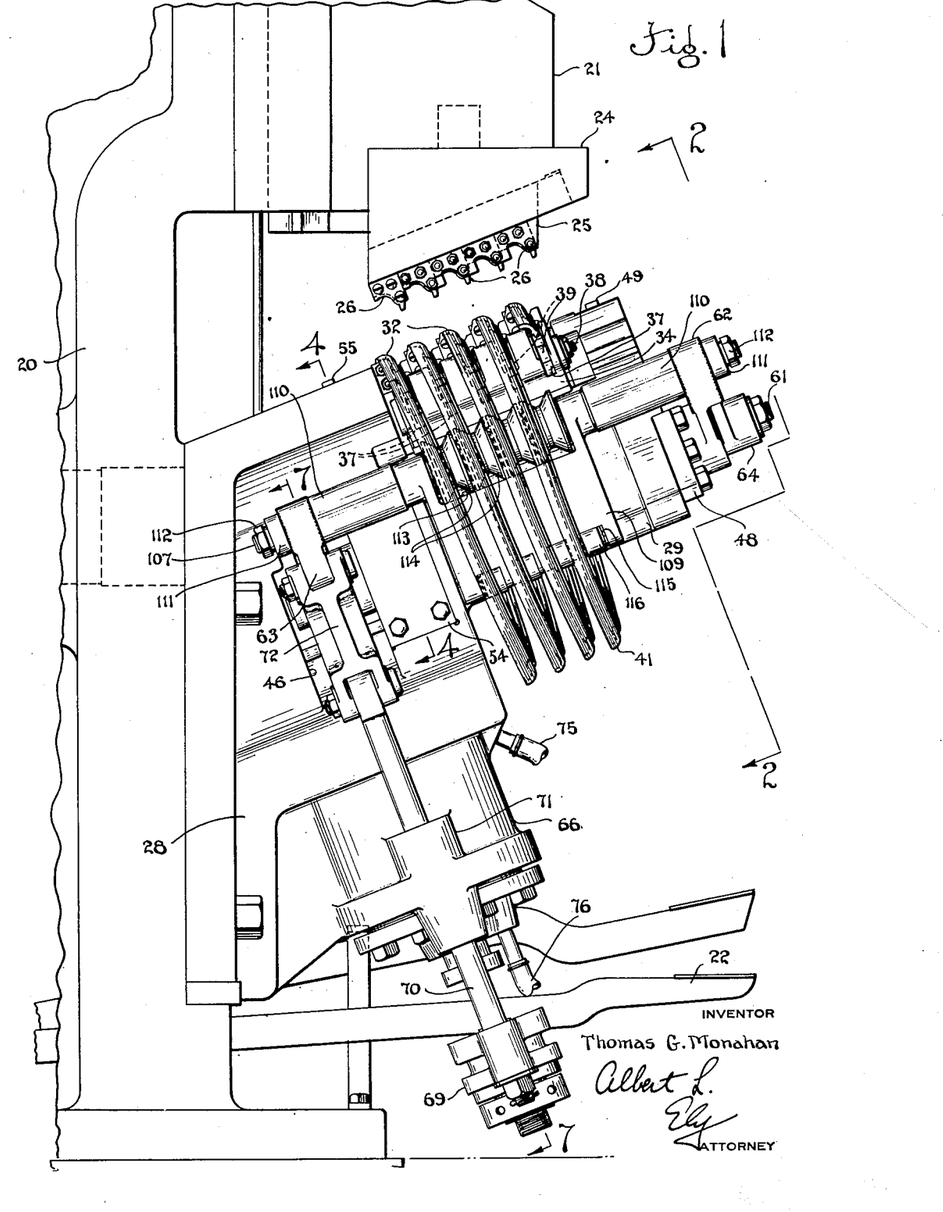
Figure 1 is a side elevation of apparatus embodying and adapted to carry out the invention in its preferred form, and the work therein, in work-receiving position, a part of the apparatus being broken away.
Figure 2:
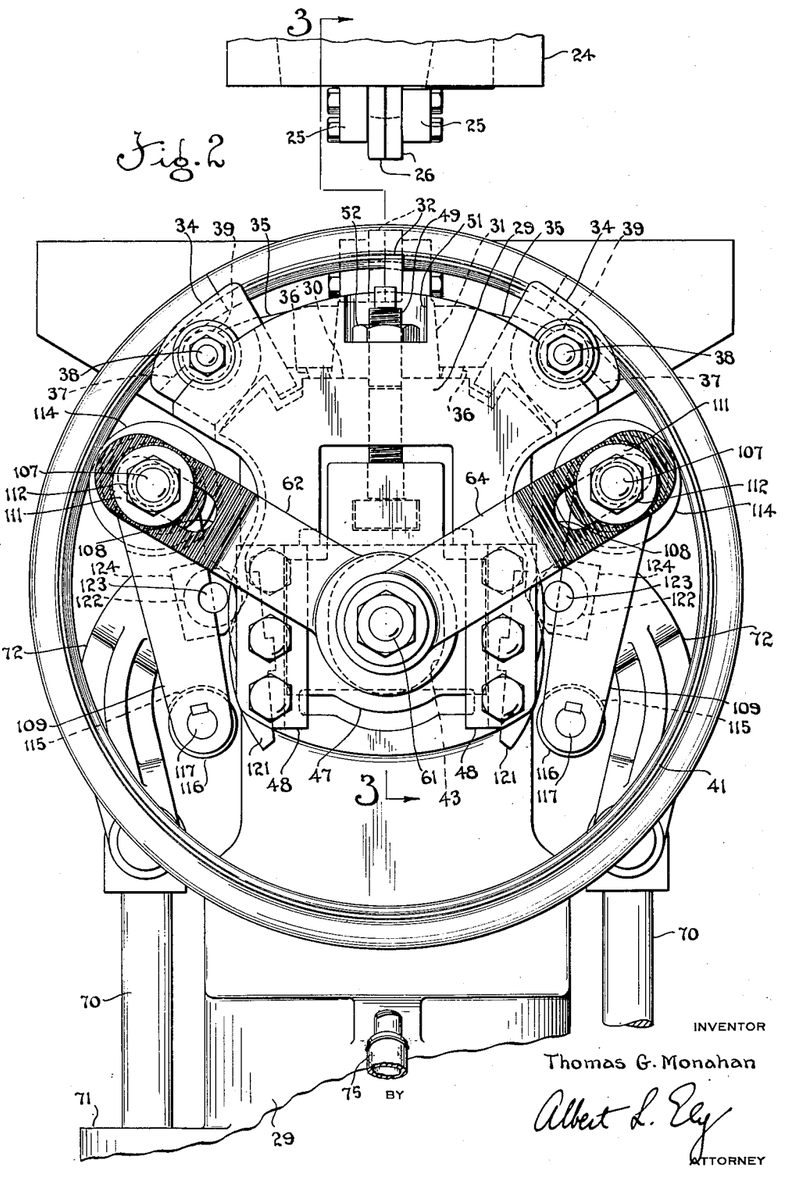
Figure 2 is a front elevation of the apparatus shown in Figure 1 as viewed from the line 2—2 thereof.
Figure 3:
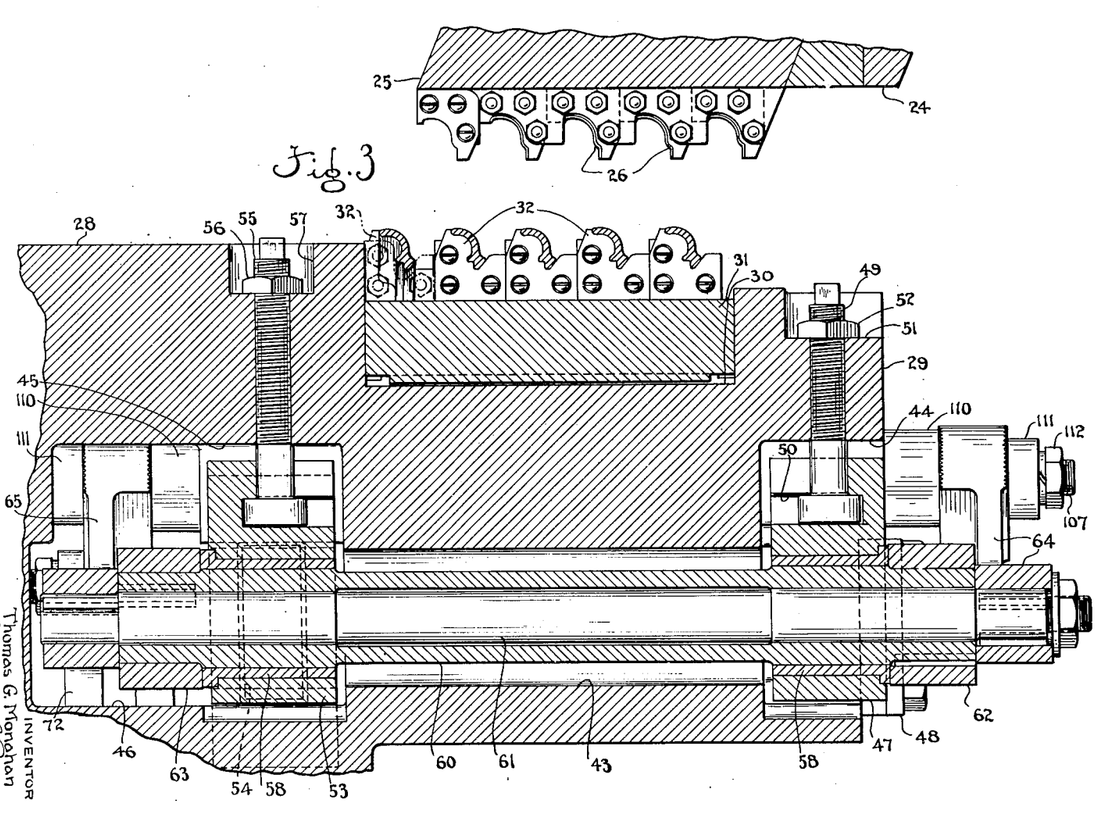
Figure 3 is a section on the line 3—3 of Figure 2.

In mounting the coil 41 in the apparatus, the operator passes the coil over horn 29, manually separates the respective convolutions of the coil, and inserts them in the respective slots 37 of the spreader shoes 34, as shown in Figure 1, that portion of each convolution intermediate the spreader shoes being properly positioned with relation to the shearing dies 32, as shown best in Figure 3. The overlapped end portions of the coil are positioned centrally at the top thereof, one on each side of the dies 32, as shown in Figure 2. After the coil 41 is mounted upon the apparatus, it is expanded or increased in diameter so that the rings sheared therefrom are of longer length than the circumference of the finished rings, the excess length being utilized during the subsequent welding together of the end portions of the rings. Expansion of the coil is effected by radially directed rolling pressure applied to four different points on each convolution of the coil.

Referring now to Figure 3 of the drawings, it will be seen that the horn 29 is formed with a longitudinal bore 43 extending from a rectangular shaped recess 44 in the front end of the horn to a transverse slot 45 through the rear end of the horn, there being a transverse slot 46 of larger size, contiguous with slot 45, extending through bracket structure 28. As shown most clearly in Figure 15, bore 43 is elliptical in section and has its long axis vertically disposed. Slidably mounted for vertical movement in front recess 44 is a bearing block 47, said bearing block being retained in said recess by a pair of guard plates 48, 48 affixed to the front end of the horn. Vertical adjustment of bearing block 47 is effected by means of an adjusting screw 49 that has an enlarged head at its lower end mounted in an undercut slot 50 formed in the top of the bearing block, said screw being threaded upwardly through the horn structure into a recess 51 in the top thereof, and having a lock nut 52 threaded onto its upper end portion bearing against the bottom of said recess.

Figure 4:
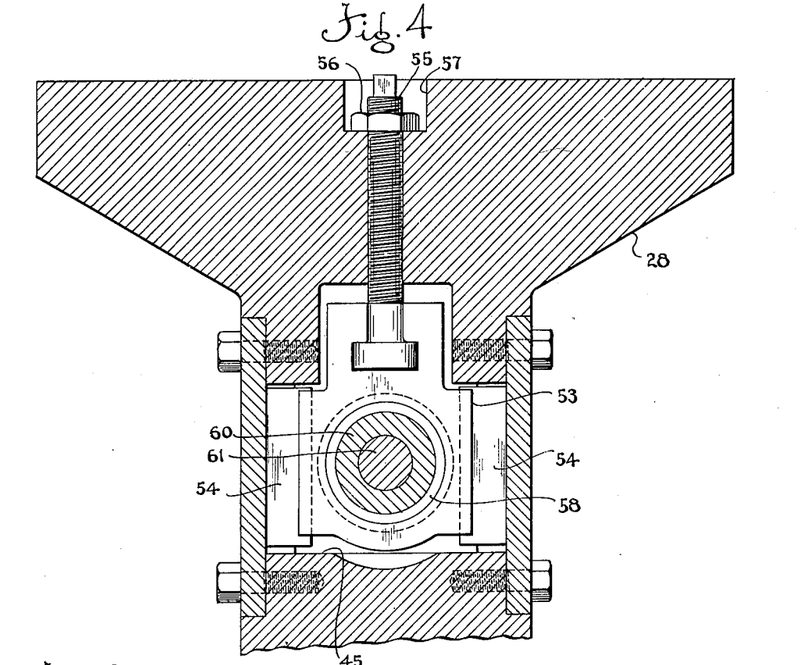
Figure 4 is a section on the line 4—4 of Figure 1.

A somewhat similar rear bearing block 53 is slidably mounted in transverse slot 45 between lateral guide plates 54, 54 positioned over the open ends of said slot as shown in Figure 4. Bearing block 53 is provided with an upwardly extending adjusting screw 55 that has a lock nut 56 threaded onto its upper end portion, which is positioned within a recess 57 in the top of the horn structure. Both adjusting screws have squared end portions for engagement with a wrench.

Journaled in bushings 58 of bearing blocks 47, 53 is a quill 60 that projects beyond the said bearing blocks at both its ends, and journaled in quill 60 is a shaft 61 that projects beyond both ends of said quill, the arrangement being such that quill 60 and shaft 61 may be moved angularly of each other. Mounted upon the projecting front end portion of quill 60 is a laterally extending spreader arm 62, and a somewhat similar spreader arm 63 is secured to the projecting rear end portion of said quill, the arms 62, 63 being parallel to each other, the rear arm 63 extending outwardly from slot 46. In like manner a spreader arm 64, similar to arm 62, is mounted upon the projecting front end portion of shaft 61, and a spreader arm 65, similar to arm 63, is mounted upon the projecting rear end portion of said shaft and projects outwardly from slot 46. Arms 64, 65 are parallel to each other, and project in opposite direction with relation to arms 62 and 63. Thus arms 62, 63 may be oscillated in unison by angular movement of quill 60, and arms 64, 65 may be similarly oscillated by angular movement of shaft 61.

Figure 7:
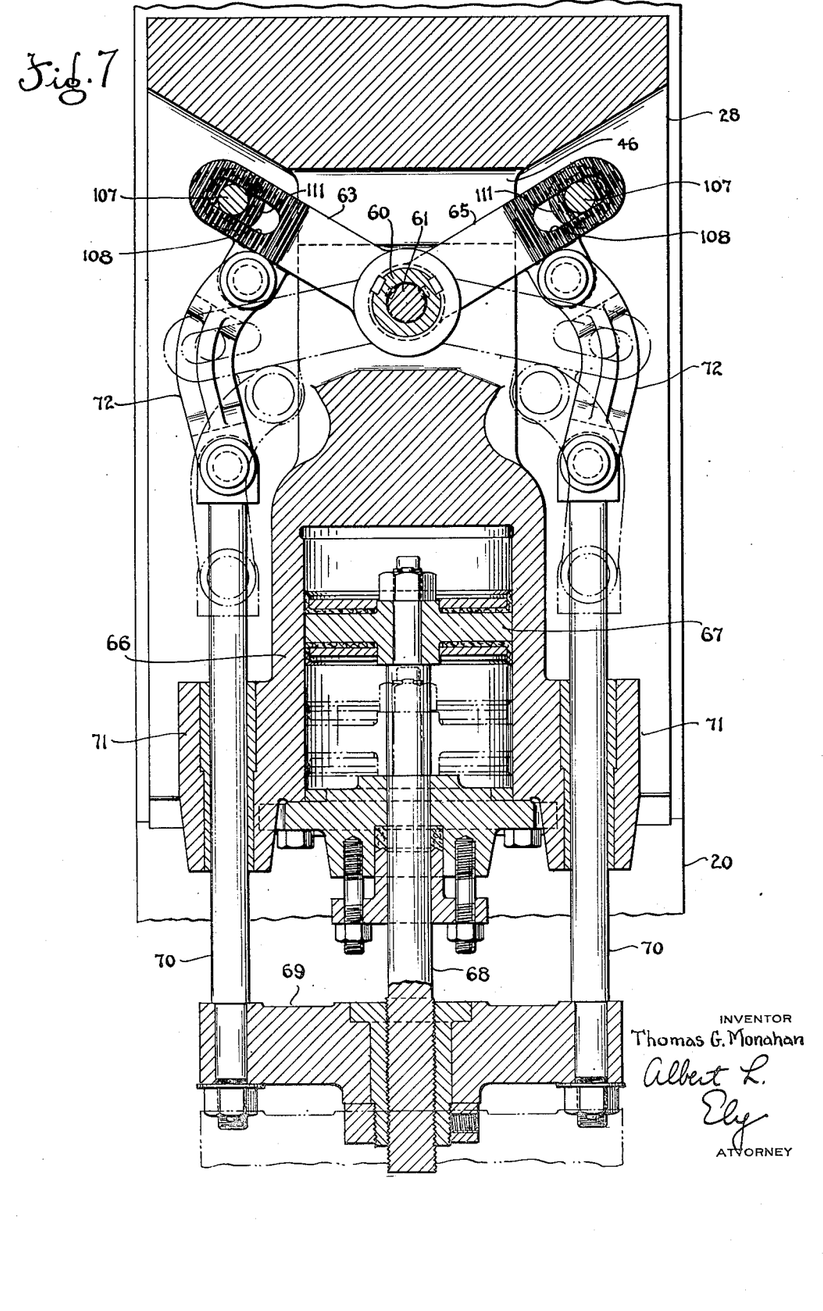
Figure 7 is a section, on a larger scale, on the line 7—7 of Figure 1.

Quill 60 and shaft 61 are rocked in unison by means of a double-acting fluid pressure cylinder 66 that is formed integral with bracket structure 28, below horn 29, the axis of said cylinder being perpendicular to the axis of said horn. The fluid pressure cylinder comprises a piston 67, and a downwardly-extending piston rod 68 upon the lower or outer end of which a yoke or cross-head 69 is mounted, said cross-head having limited adjustability longitudinally of said piston rod. Secured to the respective ends of the cross-head 69 are drag-rods 70, 70 that extend upwardly therefrom on opposite sides of the cylinder 66, passing slidingly through respective guide-brackets 71 formed on the cylinder wall. At their upper ends the drag-rods are pivotally connected to one end of respective arcuate drag links 72, the other ends of said links being pivotally connected to respective rear spreader arms 63 and 65. Operation of cylinder 66 moves the arms 63, 65 between the positions shown in full lines in Figure 7 and the positions shown in broken lines in the same figure.

Pressure fluid such as water, is conducted to the upper end of cylinder 66 through inlet-and-outlet pipe 75, and in like manner is conducted to the lower end of said cylinder through inlet-and-outlet pipe 76. Fluid conductor pipes 75, 76 extend to a four-way valve 77, Figure 10, that is mounted upon the rear of the frame 20, said valve also being connected to an exhaust pipe 78, and a fluid supply pipe 79 that extends to a source of pressure fluid (not shown). The valve 77 is of the sliding type, and is operated by the piston rod 80 of a double-acting fluid pressure cylinder 81 that is mounted beside and in axial alignment with said valve 77. Pressure fluid, preferably air, is supplied to the respective ends of cylinder 81 through inlet-and-outlet pipes 82, 83 that extend to a four-way rotary plug valve 84 mounted upon the side of apparatus frame 20, said valve also including an exhaust pipe 85, and a fluid inlet pipe 86 connected with a source of fluid pressure (not shown).

Figures 8, 9:
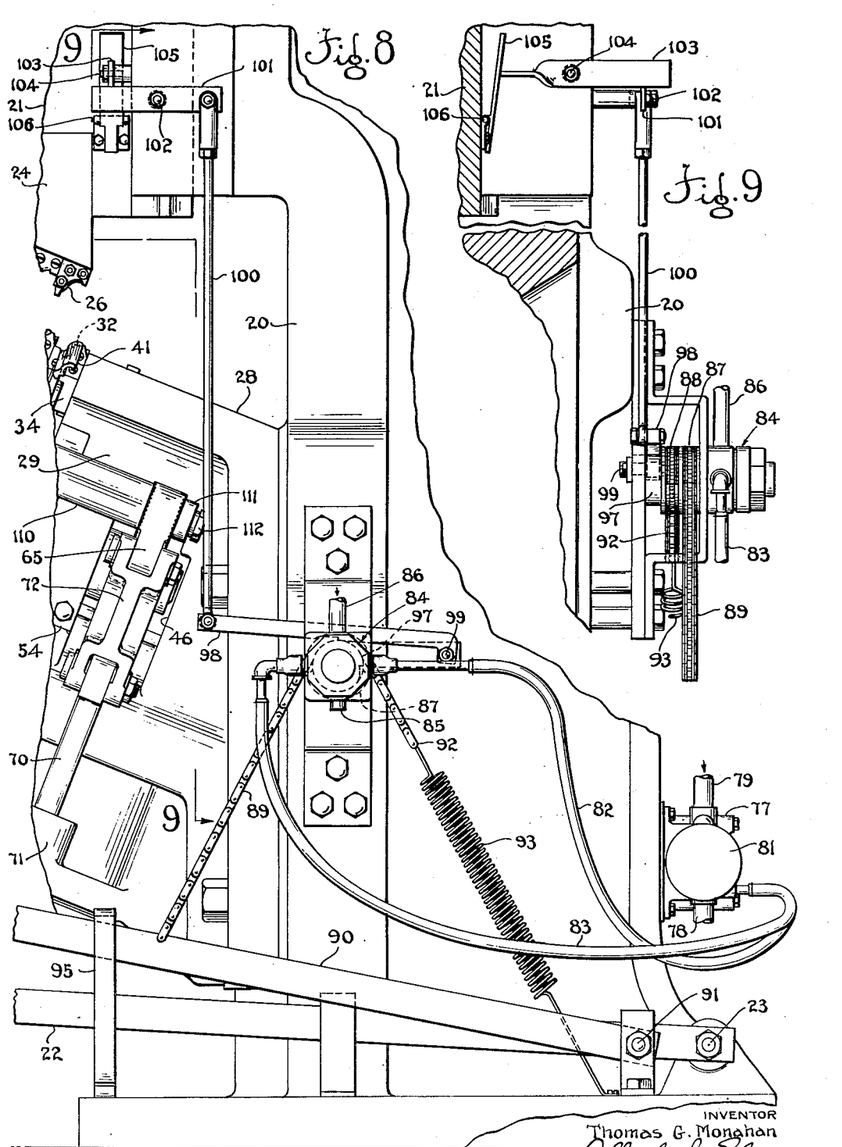
Figure 8 is a partial side elevation of the apparatus viewed from the side opposite Figure 1.
Figure 9 is a section on the line 9—9 of Figure 8.

The rotary plug of valve 84 is turned angularly by means of a pair of sprockets 87, 88, Figure 9, secured on the stem thereof. Secured to sprocket 87 and passing partly about the same is a sprocket chain 89 that has its other end connected to a foot pedal 90, the latter being pivotally mounted at 91 on the base of frame 20 and extending forwardly therefrom to the front of the machine. Secured to sprocket 88 and passing partly about the same is a sprocket chain 92 that has its other end connected to one end of a tension spring 93, the other end of the latter being secured to a fixed point on frame 20.

The arrangement is such that depressing foot pedal 90 turns valve 84 in one direction to admit fluid through one of pipes 82, 83 to operate cylinder 81 which in turn so operates valve 77 as to admit fluid through pipe 77 to the top of cylinder 66. This lowers the piston of the latter and thereby moves the spreader arms of the apparatus to proper position. Valve 84 is turned in the opposite direction to reverse the procedure described, and thereby to move the spreader arms to inoperative position, by means of the tension spring 93, which spring also lifts the foot pedal 90 to elevated, inoperative position, which position may be defined by a stop-bracket 95 which the pedal may engage.

It is essential that pedal 90 remain in depressed position during the interval that pedal 22 is depressed and released, and to this end automatically operating mechanical means is provided so that the operator is not required to use both feet to operate the apparatus. Said means comprises a one-tooth ratchet 97 mounted upon the stem of valve 84 beside sprocket 88. Engagable with ratchet 97 is a pawl 98 that is pivotally mounted at 99 upon a suitable bracket secured to frame 20, said pawl having a medial ratchet-engaging portion that engages the single tooth of ratchet 97, when the plug of valve 84 is turned counter-clockwise as viewed in Figure 8 by the depressing of foot pedal 90, with the result that pedal 90 remains depressed after the operator removes his foot therefrom. The free end of pawl 98 is pivotally connected to the lower end of a vertically arranged link 100, the upper end of which is pivotally connected to one end of a lever 101 that is pivoted at 102, at its middle. The opposite end of lever 101 is positioned in contact with the underside of one end of a lever 103 that is pivotally mounted at 104 on frame 20, at right angles to lever 101. The other end of lever 103 extends into the path of a pawl or click 105 that is pivotally mounted at 106 on the reciprocating head 21. The arrangement is such that the pawl moves freely about its pivot 106 so as to pass lever 103, in the downward movement of the head 21 without disturbing said lever. In the rising movement of said head, pawl 105 engages and tilts lever 103 so that the latter tilts lever 101 and thereby lifts link 100 to raise pawl 98 out of engagement with ratchet 97, thereby permitting spring 93 to turn valve 84 clockwise and lifting foot pedal 90 to its elevated position. This results in reversing the position of piston 67 in cylinder 66 whereby the spreader arms are returned to inoperative position.

Figure 5:
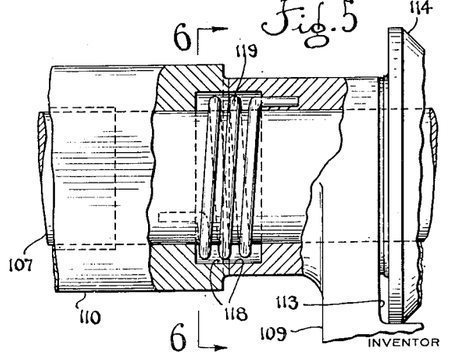
Figure 5 is a detail elevation, partly in section, showing a yielding connection between an oscillating arm and an angular extension thereof.
Figure 6:
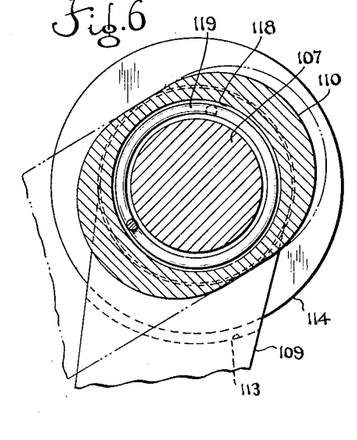
Figure 6 is a section on the line 6—6 of Figure 5.

The work-expanding mechanisms carried by the respective pairs of spreader arms 62, 63 and 64, 65, on opposite sides of horn 29, are substantially identical so that but one of them need be described, the same reference numerals being used for both. Carried at the free ends of spreader arms 62, 63 is a shaft 107, said arms being formed with longitudinally disposed slots 108 through which the shaft extends so that it is adjustable radially with relation to the axis of said arms. Journaled upon shaft 107, centrally thereof, is an extension arm 109, and at each side of said extension arm respective tubular spacer sleeves 110, 110 are mounted upon said shaft. The end portions of the spreader arms are formed with parallel knurling on their opposite faces, and the adjacent end faces of the respective spacer members are complementally knurled, the arrangement being such as to prevent relative movement between spreader arms and spacer sleeves. Similarly knurled washers 111, 111 are mounted on the shaft 107 between the outer faces of the spreader arms and nuts 112 on the respective ends of the shaft. The medial portion of extension arm 109 is cut away at 113 about shaft 107, and journaled on the latter, in said cut-away portion, is a plurality of grooved rollers 114, 114. At its free margin the extension arm is formed with a plurality of transverse slots 115, 115, and mounted in said slots are respective rollers 116 that are journaled on a shaft 117 that traverses said slots 115. The rollers 116 are substantially in alignment with the respective rollers 114. Suitable concentric recesses 118 are formed in the abutting faces of the extension arm 109 and one of the spacer sleeves 110, and in said recesses is mounted a torsion spring 119 that encircles shaft 107 and has its end portions engaging the extension arm and spacer sleeve respectively, as is most clearly shown in Figures 5 and 6.

The arrangement is such that the extension arm 109 normally yieldingly is urged angularly about shaft 107 toward the adjacent side of horn 29. Mounted upon the lateral face of horn 29 is a cam plate 121 that has a cam face that is convex about an axis extending longitudinally of the horn. Engaging cam 121 is a plurality of cam rollers 122 that are journaled upon a shaft 123 carried in a suitable supporting block 124 that is mounted upon the adjacent lateral face of extension arm 109, the torsion spring 119 urging the cam rollers constantly into engagement with the cam.

In the operation of the apparatus, the same being in the inoperative position shown in Figures 1 and 2, the operator mounts the work-coil 41 by separating the convolutions thereof and seating them upon the supporting rollers 39 and in proper relation to shearing dies 32, with the overlapped end portions of the coil in proper angular position as previously has been described. It will be noted that the distance between the supporting rollers 39 and shaft 61 is greater than the radius of the work-coil. This is necessarily so and the feature of providing adjusting screws 49, 55 for bearing blocks 47, 53 respectively make it possible to alter the position of shaft 61 to obtain this condition when work-coils of different diameters are to be sheared.

Figure 15:
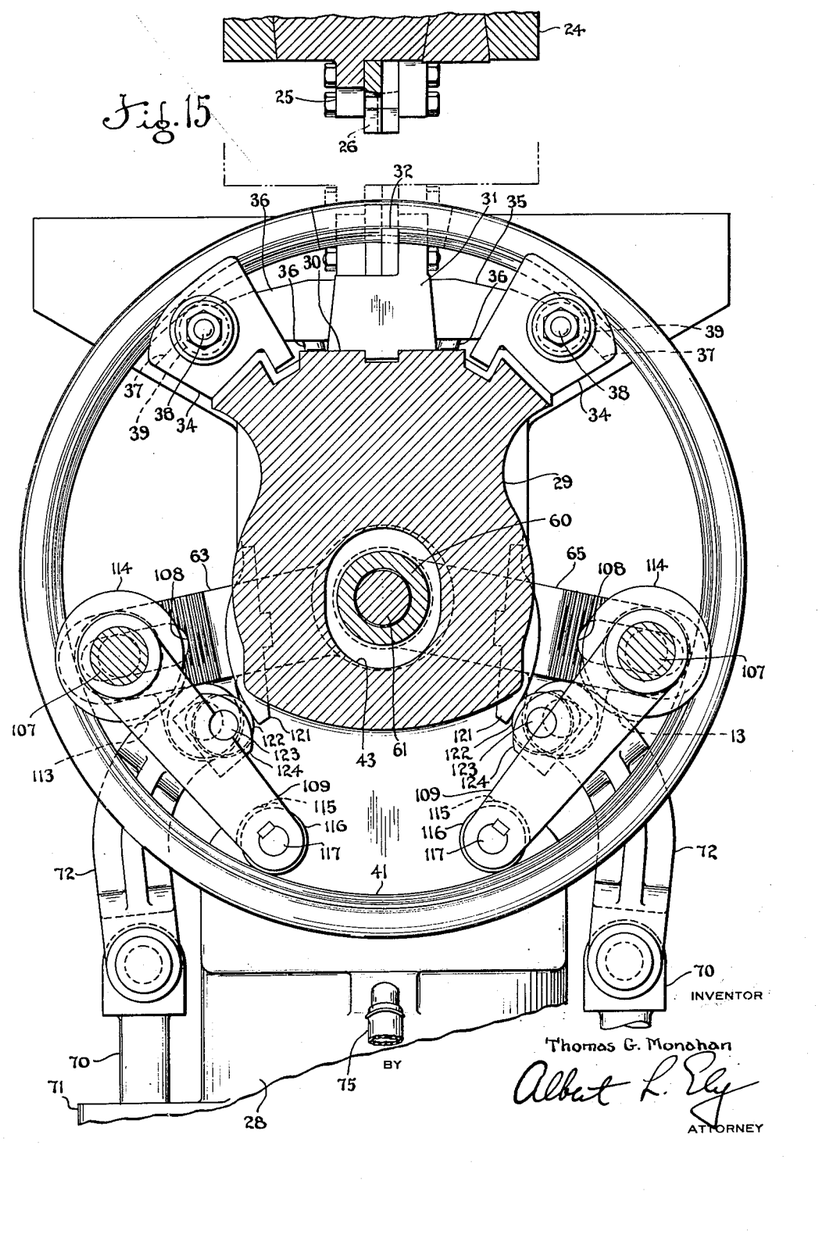
Figure 15 is a section on the line 15—15 of Figure 14.

The operator then depresses pedal 90 which operates valves 84 and 77 to cause pressure fluid to flow into the upper end of cylinder 66, thereby moving cross-head 69 downwardly and moving the spreader arms 62, 63 and 64, 65 and extension arms 109 from the position shown in Figure 2 to the position shown in Figure 15. As said arms move to the latter position, rollers 114 engage the respective convolutions of the work at two widely separated points and rollers 116 engage said convolutions at spaced points, and press outwardly upon said convolutions, with the result that the diameter of the work-coil is enlarged by a partial uncoiling or untwisting thereof, which shortens the overlap of the end portions of the coil. Since the coil 41 is supported entirely upon rollers, the expansion of the coil is accomplished with minimum effort and friction. As soon as pedal 90 is depressed, pawl 98 engages one-tooth ratchet 97 associated with valve 84, and prevents reversal of said valve when the operator removes his foot from pedal 90, with the result that the spreader arms continue to hold to work-coil in expanded position. The rollers 39, 114 and 116 provide six points of support for each convolution of the work whereby the latter is securely held with but slight deformation, if any.

The operator then depresses foot pedal 22 which operates the proper mechanism to cause the head 21 to perform an operative cycle consisting of a downward movement and then an upward movement. At the lowermost position of the head 21, the blades 26 carried thereby are in shearing relation with dies 32, thereby shearing the several convolutions of the work, and producing a plurality of split rings 125, Figures 12 and 13. As the head 21 rises after its downward, cutting stroke, click 105 on said head engages and tilts lever 103, which motion is translated through lever 101 and link 100 to pawl 98 to lift the latter so that it releases one-tooth ratchet 97.

Spring 93 then lifts pedal 90, and reverses the position of valve 84, thus causing valve 77 to discharge the pressure fluid from the upper end of cylinder 66 and concurrently to charge the lower end thereof, whereby the spreader arms are returned to their normal inoperative positions. This completes one cycle of operation of the apparatus. Because the work-coil 41 is sheared while in expanded condition, each ring 125 is somewhat longer than a convolution of the original coil, so that when said rings are removed from the shearing apparatus their end portions overlap about a half inch, as is clearly shown in Figure 13. This overlap or surplus is utilized when the respective ends of the rings subsequently are welded together to produce endless structures.

The apparatus is rapid and accurate in operation, it is capable of adjustment for cutting coils of various diameters, and it accomplishes the other advantages set out in the foregoing statement of objects.

Modification may be resorted to without departing from the spirit of the invention or the scope of the appended claims.

What is claimed is:

1. The method of making metal rings which comprises forming a metal strip into a helical coil of a plurality of convolutions, supporting the coil with the convolutions thereof in uniformly spaced relation, increasing the diameter of said coil, and then concurrently severing all the convolutions of the coil while its diameter is so increased.

2. The method of making metal rings which comprises forming a metal strip into a helical coil of a plurality of convolutions, supporting the coil with all the convolutions thereof in laterally spaced relation to each other, effecting an untwisting of the coil so as uniformly to increase the diameter thereof, and then concurrently shearing all the convolutions of the coil in a direction transversely of its axis to produce individual rings from the respective convolutions thereof.

3. The method of making metal rings which comprises forming a metal strip into a helical coil of a plurality of convolutions, axially elongating the coil to uniformly separate the convolutions thereof, concurrently applying outwardly directed rolling pressure to the inner periphery of the respective convolutions of the coil, to increase the diameter of the latter uniformly throughout its length, and then shearing through the respective convolutions of the coil, parallel to the axis thereof, while its diameter is so increased.

4. The method of making metal rings which comprises forming a coil consisting of a plurality of helical convolutions of metal strip material, supporting the coil with all the convolutions thereof in laterally spaced relation to each other, concurrently applying outwardly directed pressure upon all of said convolutions so as uniformly to increase the diameter of the coil, and then concurrently severing all the convolutions of the coil while their diameter is so increased.

5. The method of making metal rings which comprises shaping a metal strip to circular form with the end portions thereof substantially overlapped, retracting the ends of the strip to reduce the extent of the overlap thereof and thereby to increase the diameter of the structure, and then transversely shearing the overlapped portions of the structure in a direction transversely of its axis, while its diameter is so increased whereby both of said end portions are removed from the structure.

6. The method of making metal rings having overlapped ends of determinate extent which comprises forming a strip of metal into a ring of the exact diameter desired, the end portions of the ring being substantially overlapped, determinately distending the ring, against the spring of the metal, to increase its diameter and to retract the strip ends to reduce the extent of the overlap thereof, transversely shearing overlapped portions of the ring in a direction transversely of its axis whereby both end portions of the ring simultaneously are removed, and thereafter releasing the ring so that it restores itself to its original diameter with overlapped ends of determinate length.

THOMAS G. MONAHAN.